US012767103B2

(12) United States Patent
Weh et al.

(10) Patent No.: US 12,767,103 B2
(45) Date of Patent: Oct. 20, 2026

(54) HYDRAULIC BLOCK FOR A HYDRAULIC UNIT FOR AN ELECTROHYDRAULIC DUAL-CIRCUIT POWER BRAKE SYSTEM

(71) Applicant: Robert Bosch GmbH, Stuttgart (DE)

(72) Inventors: Andreas Weh, Sulzberg (DE); Martin Hagspiel, Rettenberg (DE); Matthias Mayr, Rettenberg (DE); Stefan Kaserer, Ofterschwang (DE)

(73) Assignee: Robert Bosch GmbH, Stuttgart (DE)

( * ) Notice: Subject to any disclaimer, the term of this patent is extended or adjusted under 35 U.S.C. 154(b) by 409 days.

(21) Appl. No.: 18/559,092

(22) PCT Filed: Jan. 20, 2023

(86) PCT No.: PCT/EP2023/051378
§ 371 (c)(1),
(2) Date: Nov. 6, 2023

(87) PCT Pub. No.: WO2023/160915
PCT Pub. Date: Aug. 31, 2023

(65) Prior Publication Data
US 2024/0239318 A1 Jul. 18, 2024

(30) Foreign Application Priority Data
Feb. 23, 2022 (DE) ..................... 10 2022 201 864.8

(51) Int. Cl.
*B60T 8/36* (2006.01)
*B60T 13/74* (2006.01)

(52) U.S. Cl.
CPC ............ *B60T 8/368* (2013.01); *B60T 13/745* (2013.01)

(58) Field of Classification Search
CPC ............................... B60T 8/368; B60T 13/745
USPC .......................... 303/114.1; 60/533, 562, 586
See application file for complete search history.

(56) References Cited

U.S. PATENT DOCUMENTS

| | | | | |
|---|---|---|---|---|
| 6,014,862 | A | 1/2000 | Shaw et al. | |
| 11,505,169 | B2 * | 11/2022 | Friedrich | B60T 8/326 |
| 2010/0207446 | A1 * | 8/2010 | Tandler | B60T 8/368 303/10 |
| 2016/0229383 | A1 * | 8/2016 | Leiber | B60T 13/686 |

FOREIGN PATENT DOCUMENTS

| | | | |
|---|---|---|---|
| DE | 102020201083 | A1 | 8/2021 |
| EP | 2641788 | A1 | 9/2013 |
| JP | H11513630 | A | 11/1999 |
| JP | 2019503937 | A | 2/2019 |
| JP | 2020536784 | A | 12/2020 |
| KR | 20200123792 | A | 10/2020 |

OTHER PUBLICATIONS

International Search Report for PCT/EP2023/051378, Issued Apr. 20, 2023.

* cited by examiner

*Primary Examiner* — Christopher P Schwartz
(74) *Attorney, Agent, or Firm* — Norton Rose Fulbright US LLP

(57) ABSTRACT

A hydraulic block for a hydraulic unit for an electrohydraulic dual-circuit power brake system for a motor vehicle which drives autonomously on public roads. Two chambers of a power cylinder bore in the hydraulic block are connected by nonreturn valves and in parallel by bypass lines to chambers of a brake fluid reservoir arranged on the hydraulic block. Further brake fluid may be drawn in when the power cylinder is actuated.

12 Claims, 3 Drawing Sheets

HYDRAULIC BLOCK FOR A HYDRAULIC UNIT FOR AN ELECTROHYDRAULIC DUAL-CIRCUIT POWER BRAKE SYSTEM

FIELD

The present invention relates to a hydraulic block for a hydraulic unit for an electrohydraulic dual-circuit power brake system.

BACKGROUND INFORMATION

Electrohydraulic power brake systems generate a hydraulic brake pressure for actuating hydraulic wheel brakes powered manner, to which end for example a power piston is displaced in a power cylinder with an electric motor by way of a screw transmission.

European Patent Application No. EP 2 641 788 A1 describes an electrohydraulic dual-circuit power brake system with a hydraulic block which has a brake master cylinder actuatable with muscle power and a power cylinder which is arranged axially parallel to the brake master cylinder. The power cylinder has a power cylinder bore in which two power pistons arranged axially one behind the other are displaceably arranged, as is conventional dual-circuit brake master cylinders. In contrast with brake master cylinders actuatable with muscle power, a hydraulic brake pressure is generated in the conventional vehicle brake system by displacing one of the two power pistons in the power cylinder bore with power from an electric motor by way of a spur wheel transmission as step-down transmission and a ball-screw drive. Two brake fluid reservoirs are arranged on the hydraulic block, one of which brake fluid reservoirs communicates with the brake master cylinder in both brake circuits and the other communicates with the power cylinder in both brake circuits.

SUMMARY

A hydraulic block according to the present invention is provided for a hydraulic unit for an electrohydraulic dual-circuit power brake system, the hydraulic block equipped with components intended therefor forming the hydraulic unit. In order to generate hydraulic brake pressure with power, the hydraulic block according to an example embodiment of the present invention has a power cylinder bore in which two power pistons are displaceably arranged. In order to generate the braking force, a first of the two power pistons is displaced in the power cylinder bore of the hydraulic block with an electric motor by way of a screw transmission, preferably with an interposed step-down transmission, so generating a hydraulic brake pressure in a first brake circuit. A second of the two power pistons is acted upon by the brake pressure which is generated by the first power piston, as a result of which the second power piston generates a brake pressure in a second brake circuit. Except for the fact that the first power piston is displaced with power instead of muscle power, the power cylinder bore functions in the same manner as a conventional dual-circuit brake master cylinder.

The hydraulic block according to an example embodiment of the present invention has two ports for a brake fluid reservoir, through which the brake fluid reservoir communicates with the power cylinder bore. Each of the two ports is connected by a nonreturn valve which permits flow from the ports for the brake fluid reservoir in the direction of the power cylinder bore and thus hydraulically in parallel through a bypass line to the power cylinder bore of the hydraulic block. The nonreturn valves allow brake fluid to be drawn from the brake fluid reservoir into the power cylinder bore when the two bypass lines are closed on actuation of the power cylinder, so that no brake fluid can be expelled from the power cylinder bore into the brake master cylinder on actuation of the power cylinder and a hydraulic brake pressure can be generated by displacement of the power pistons in the power cylinder bore.

The hydraulic block according to an example embodiment of the present invention or the hydraulic unit is provided for autonomous driving of a motor vehicle on public roads up to automation levels 4 and 5. Level 4 means a high degree of automation, i.e. the vehicle is driven by a system which can require the vehicle's driver to take over driving of the vehicle if it is no longer able to manage the driving tasks. Level 5 is the highest and means complete automation, so meaning that no vehicle driver is required. Such a vehicle has no need for a steering wheel and pedals but their presence is not ruled out. The hydraulic block or hydraulic unit may also be used for lower automation levels and also for non-autonomous driving.

While there is indeed no provision for the hydraulic block according to the present invention additionally to have a brake master cylinder or brake master cylinder bore, the present invention does not rule out there being a brake master cylinder or brake master cylinder bore in the hydraulic block.

Further developments and advantageous refinements of the present invention are disclosed herein.

All the features disclosed in the present description and the figures can be implemented in embodiments of the present invention individually by themselves or, in principle, in any desired combination. Embodiments of the present invention which do not include all but rather only one or more features of an embodiment of the present invention are in principle possible.

BRIEF DESCRIPTION OF THE DRAWINGS

The present invention is explained in greater detail below with reference to an example embodiment illustrated in the figures.

Figure 1:
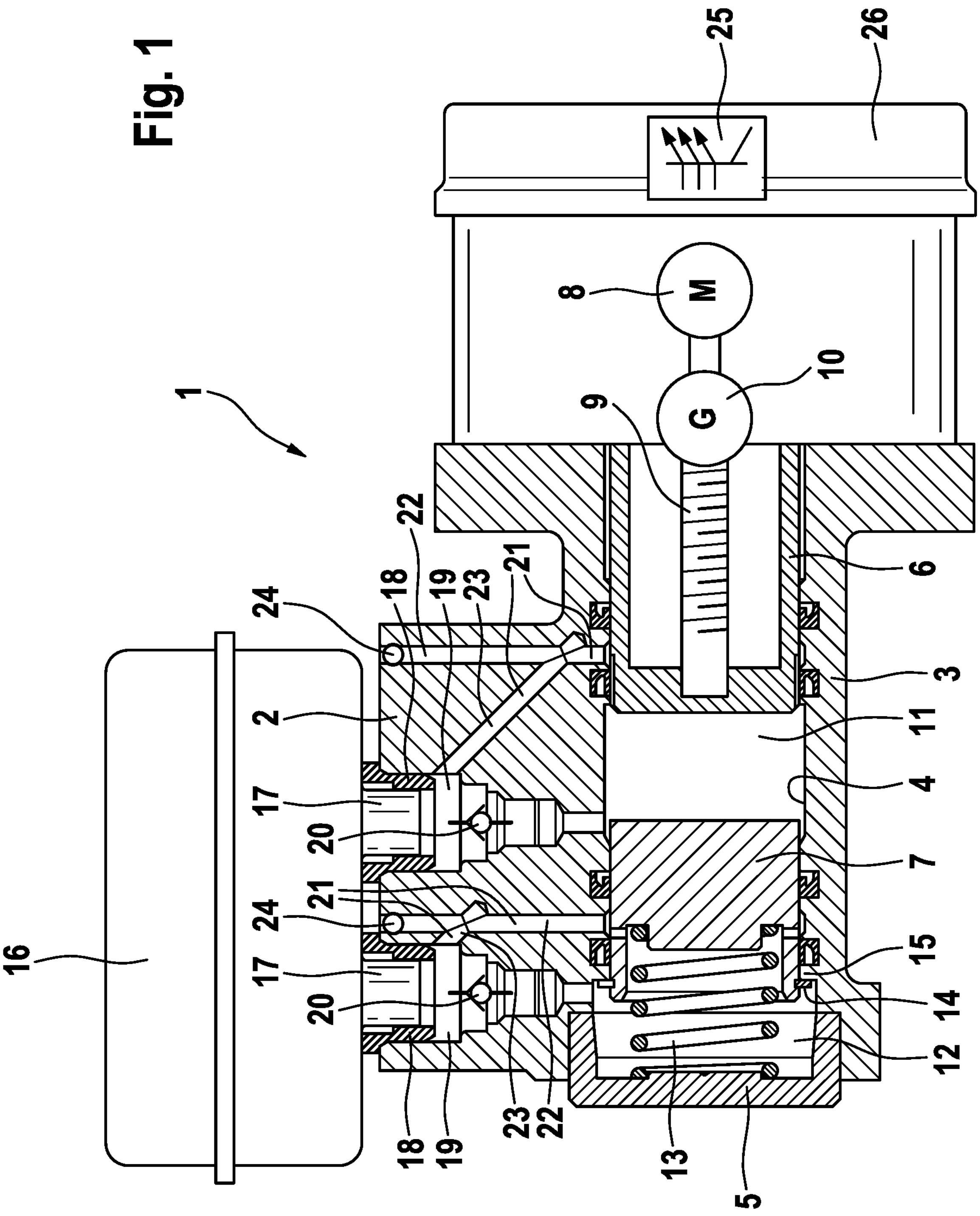
FIG. 1 shows an axial section through a power cylinder bore of a hydraulic block of a hydraulic unit according to an example embodiment of the present invention.

Identical components are denoted with matching reference numerals in all the figures.

DETAILED DESCRIPTION OF EXAMPLE EMBODIMENTS

Figure 2:
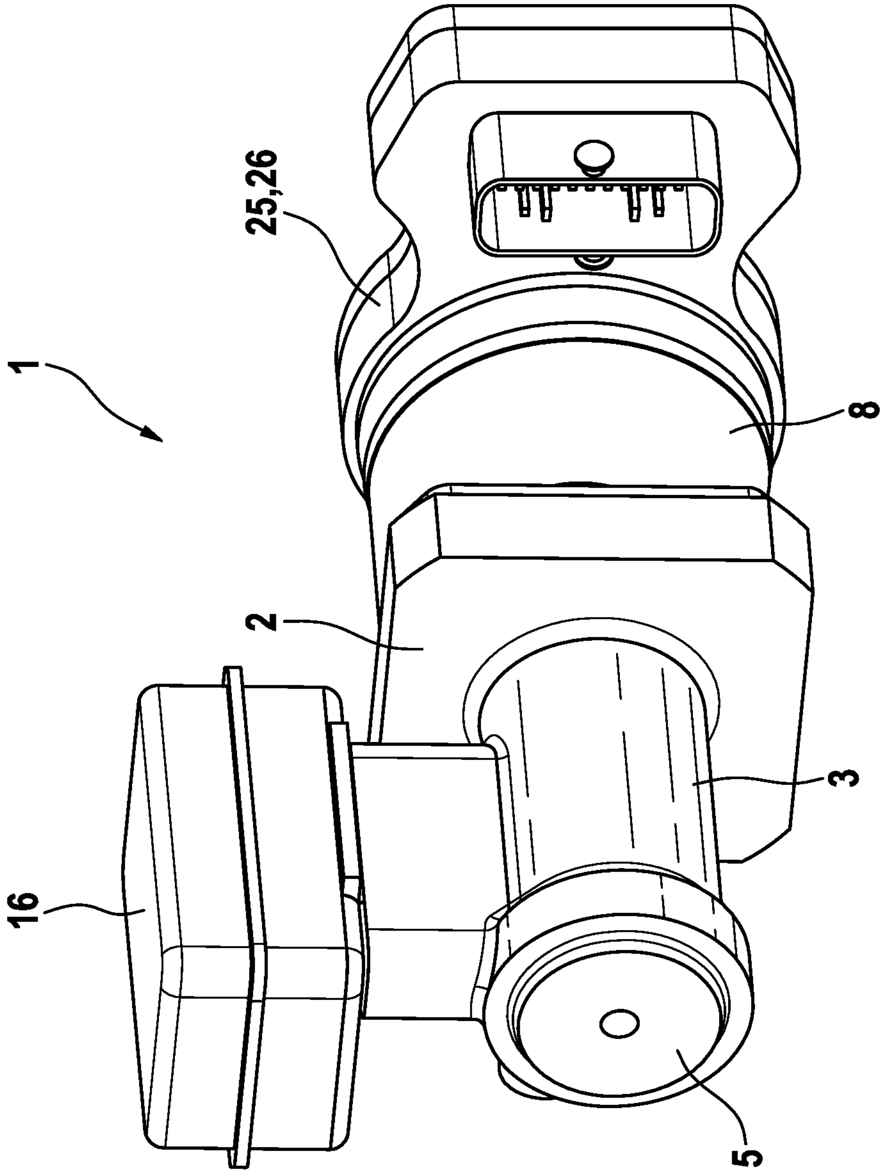
FIG. 2 shows a perspective representation of the hydraulic unit from FIG. 1.

The hydraulic unit 1 depicted in FIGS. 1 and 2 is provided for generating a hydraulic brake pressure with power in a slip-controlled, hydraulic dual-circuit power brake system which is not otherwise shown. A slip control unit (not shown), inter alia including solenoid valves and hydraulic pumps, is connected by way of brake lines to the hydraulic unit 1, forming a slip control system, and hydraulic wheel brakes of the vehicle brake system are connected by way of brake lines to the slip control unit. The slip control unit (not shown) provides closed-loop control of brake pressure in a slip control system. Such slip control systems are for example antilock braking, traction control or vehicle dynamics control systems which are commonly known by the abbreviations ABS, TCS and/or VDC. Slip control systems are conventional and are not explained here.

The hydraulic unit 1 is provided for an electrohydraulic dual-circuit power brake system for a motor vehicle capable of driving autonomously on public roads up to automation levels 4 and 5. Level 4 means a high degree of automation, i.e. the vehicle is driven by a system which can require the vehicle's driver to take over driving if it is no longer able to manage the driving tasks. Level 5 is the highest and means complete automation, so meaning that no vehicle driver is required. Such a vehicle has no need for a steering wheel and pedals but their presence is not ruled out. The hydraulic unit 1 according to the present invention may of course also be used for generating a brake pressure with power in vehicle brake systems for lower automation levels and also for non-autonomous driving.

While actuation of the vehicle brake system with muscle power is indeed not provided, the present invention does not rule this out.

The hydraulic unit 1 has a hydraulic block 2 according to the present invention which is embodied comparably to a conventional brake master cylinder actuatable with muscle power except that a hydraulic brake pressure for actuating the vehicle brake system is generated with power instead of with muscle power.

The hydraulic block 2 forms or has a power cylinder 3 with a power cylinder bore 4, one end of which is closed (not shown) or provided with pressure-tight closure with a closure cap 5 and the other end of which is open.

Two pistons, here denoted power pistons 6, 7, are arranged axially displaceably one behind the other in the power cylinder bore 4, the two power pistons being axially mobile relative to one another.

In order to generate the hydraulic brake pressure with power, a first of the two power pistons 6 close to the open end of the power cylinder bore 4 is axially displaceable in the power cylinder bore 4 with an electric motor 8 by way of a screw transmission 9, a planetary transmission being arranged as a step-down transmission 10 between the electric motor 8 and the screw transmission 9 in the exemplary embodiment. In the exemplary embodiment, the screw transmission 9 shown schematically in FIG. 1 is a ball-screw drive, it also being possible to use other screw transmissions or in general rotation/translation conversion mechanisms which convert a rotational motion of the electric motor 8 into translation for displacing the first power piston 6 (not shown). In the exemplary embodiment, the first power piston 6 is a tubular hollow piston closed at the end remote from the electric motor 8, in which the screw transmission 9 is in part arranged and from which the screw transmission 9 in part projects in the direction of the electric motor 8.

The electric motor 8 is arranged on the hydraulic block 2 or the power cylinder 3 coaxially with the power cylinder bore 4 at the open end of the power cylinder bore 4. The step-down transmission 10 represented in FIG. 1 as a graphical symbol is arranged, in the exemplary embodiment likewise coaxially with the power cylinder bore 4, between the electric motor 8 and the screw transmission 9.

The screw transmission 9, depending on design a spindle or a nut of the screw transmission 9, is rigidly connected to the first power piston 6 such that the screw transmission 9 can exert on the first power piston 6 not only a compressive force directed in the direction of the closed end of the power cylinder bore 4 or in the direction of the closure cap 5 for generating the hydraulic brake pressure but also a tensile force directed in the opposite direction for returning the first power piston 6 in the direction of the electric motor 8 into a home position which the first power piston 6 occupies when the vehicle brake system is not actuated and the power cylinder bore 4 is pressureless. Because it is possible to draw the first power piston 6 back into its home position in the power cylinder bore 4 with the electric motor 8 by way of the screw transmission 9, a piston spring for returning the first power piston 6 is not necessary, nor is it present in the exemplary embodiment. The present invention does not, however, rule out a piston spring for the first power piston 6 which might for example be arranged in the form of a helical compression spring between the first power piston 6 and the other, second power piston 7 (not shown).

The second power piston 7, a "floating" piston, is acted upon by the hydraulic brake pressure which the first power piston 6 generates in a first chamber 11 of the power cylinder 3 in the power cylinder bore 4 between the first and second power pistons 6, 7. By being exposed to pressure, the second power piston 7 likewise generates a hydraulic brake pressure in a second chamber 12 of the power cylinder 3 in the power cylinder bore 4 between the closed end of the power cylinder bore 4 or the closure cap 5 and the second power piston 7.

A piston spring 13, in the exemplary embodiment a helical compression spring, is arranged between the second power piston 7 and the closed end of the power cylinder bore 4 or the closure cap 5, which spring acts upon the second power piston 7 in the direction of the first power piston 6 and in the direction of the electric motor 8 and thus into its home position which the second power piston 7 occupies when the vehicle brake system is not actuated and the power cylinder bore 4 is pressureless.

In the exemplary embodiment, the second power piston 7 has, in a peripheral groove, a retaining ring 14 which protrudes radially outward in the manner of a flange and interacts with a radially small step in diameter in the power cylinder bore 4. The step in diameter in the power cylinder bore 4 forms a stroke limit stop 15 for the second power piston 7 which limits the displacement of the second power piston 7 in the direction of the first power piston 6 and in the direction of the electric motor 8 and defines the home position of the second power piston 7 when the retaining ring 14 rests against the stroke limit stop 15.

The hydraulic block 2 or power cylinder 3 according to the present invention has for each chamber 11, 12 a port (not visible in the drawings) for brake lines which connect the slip control unit (not shown) in each brake circuit hydraulically to the power cylinder 3 or, in the absence of a slip control unit, lead to the hydraulic wheel brakes (likewise not shown) of the vehicle brake system. In the home position of the second power piston 7, the piston spring 13 is pretensioned, for which reason it cannot fall out of its intended position and requires no "tethering", i.e. no additional fastening, which holds it in position.

A brake fluid reservoir 16 with two chambers is arranged on the hydraulic block 2 according to the present invention forming or including the power cylinder 3, as from conventional brake master cylinders actuated with muscle power. Each of the two chambers of the brake fluid reservoir 16 has its own connecting nipple 17 which projects outward or downward from the bottom of the brake fluid reservoir 16 and, sealed with a seal 18, is in each case arranged in a port 19 for the brake fluid reservoir 16 in the hydraulic block 2. The ports 19 for the brake fluid reservoir 16 are portions of bores with a stepped diameter which open into the two chambers 11, 12 of the power cylinder 3 in such a manner that the two chambers of the brake fluid reservoir 16 communicate through the bores with the two chambers 11, 12 in the power cylinder bore 4. The bores are arranged and embodied such that they always communicate with chambers 11, 12 of the power cylinder 3, even when both power pistons 6, 7 are maximally displaced in the direction of the closed end or closure cap 5 of the power cylinder bore 4.

The steps in diameter of the bores in each case form receptacles for a nonreturn valve 20 through which the power cylinder bore 4 is connected to the brake fluid reservoir 6. The nonreturn valves 20 shown in FIG. 1 as graphical symbols permit flow in the direction of the power cylinder bore 4 and, on generation of the hydraulic brake pressure, prevent its being possible to expel brake fluid from the power cylinder bore 4 into the brake fluid reservoir 16, i.e., the two nonreturn valves 20 enable generation of the hydraulic brake pressure in the power cylinder bore 4.

The receptacles for the nonreturn valves 20 or the nonreturn valves 20 are arranged in the hydraulic block 2 coaxially with the ports 19 for the brake fluid reservoir 16 and radially relative to the power cylinder bore 4, but this is not essential for the present invention.

According to the present invention, the hydraulic block 2 has bypass lines 21 which connect the two chambers of the brake fluid reservoir 16 to the two chambers 11, 12 of the power cylinder bore 4 and so bypass the nonreturn valves 20. The bypass lines 21 have bores 22 in the hydraulic block 4 which extend parallel to the bores in which the nonreturn valves 20 are arranged and which open into the power cylinder bore 4 at points where the bypass lines 21 are open when the two power pistons 6, 7 are in their home positions. When the two power pistons 6, 7 are displaced in the direction of the closed end of the power cylinder bore 4 or in the direction of the closure cap 5 in order to generate the hydraulic brake pressure in the power cylinder bore 4, the power pistons 6, 7 pass over mouths of the bores 22 such that the power pistons 6, 7 block the bypass lines 21 in the manner of "plunger" or slide valves, so enabling generation of the brake pressure. Other valves, for example "central" valves, as are conventional in from conventional brake master cylinders, in the two power pistons 6, 7 are also possible in order to enable the generation of brake pressure on displacement of the power pistons 6, 7 from their home positions (not shown).

Oblique bores 23, which start from the ports 19 for the brake fluid reservoir 16 and are not closed by the connecting nipples 17 of the brake fluid reservoir 16 and lead to the bores 22, connect the bores 22 to the ports 19 for the brake fluid reservoir 16 as component parts of the bypass lines 21.

The bores 22 are closed, for example by spheres 24 press-fitted at an end of the mouths of the oblique bores 23 which is remote from the power cylinder bore 4. According to the present invention, the embodiment of the bypass lines 21 may differ from the description and from the drawing in FIG. 1.

The nonreturn valves 20 enable further brake fluid to be drawn from the brake fluid reservoir 16 into the power cylinder bore 4 when, in the case of an actuated power cylinder 3, the two power pistons 6, 7 are displaced from their home positions in the direction of the closed end of the power cylinder bore 4 or the closure cap 5 and are consequently blocking the bypass lines 21.

The hydraulic unit 1 has an electronic control unit 25 which is shown in FIG. 1 as a graphical symbol and is arranged in a housing 26 on an end wall of the electric motor 8 remote from the hydraulic block 2. The control unit 25 provides open- or closed-loop control for the electric motor 8. It may also be arranged at another location of the electric motor 8 or on the hydraulic block 2 (not shown).

Equipped with the two power pistons 6, 7, the electric motor 8, the screw transmission 9 and the step-down transmission 10, the hydraulic block 2 according to the present invention forms the hydraulic unit 1. The brake fluid reservoir 16 may likewise be considered to be a component of the hydraulic unit 1.

Figure 3:
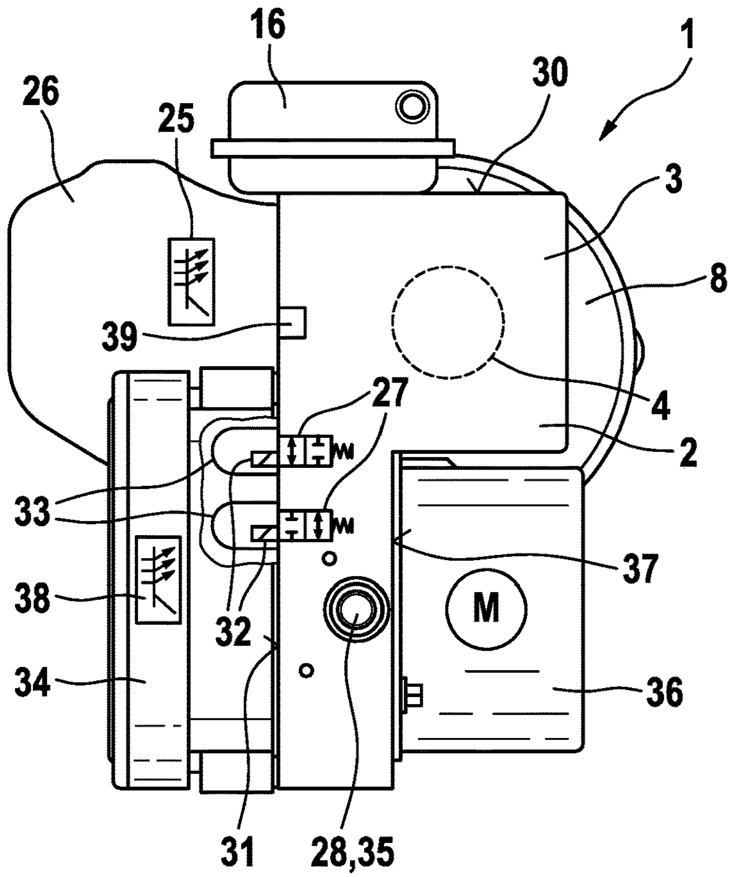
FIG. 3 shows a side view of a hydraulic unit with a hydraulic block according to a second example embodiment of the present invention.
Figure 4:
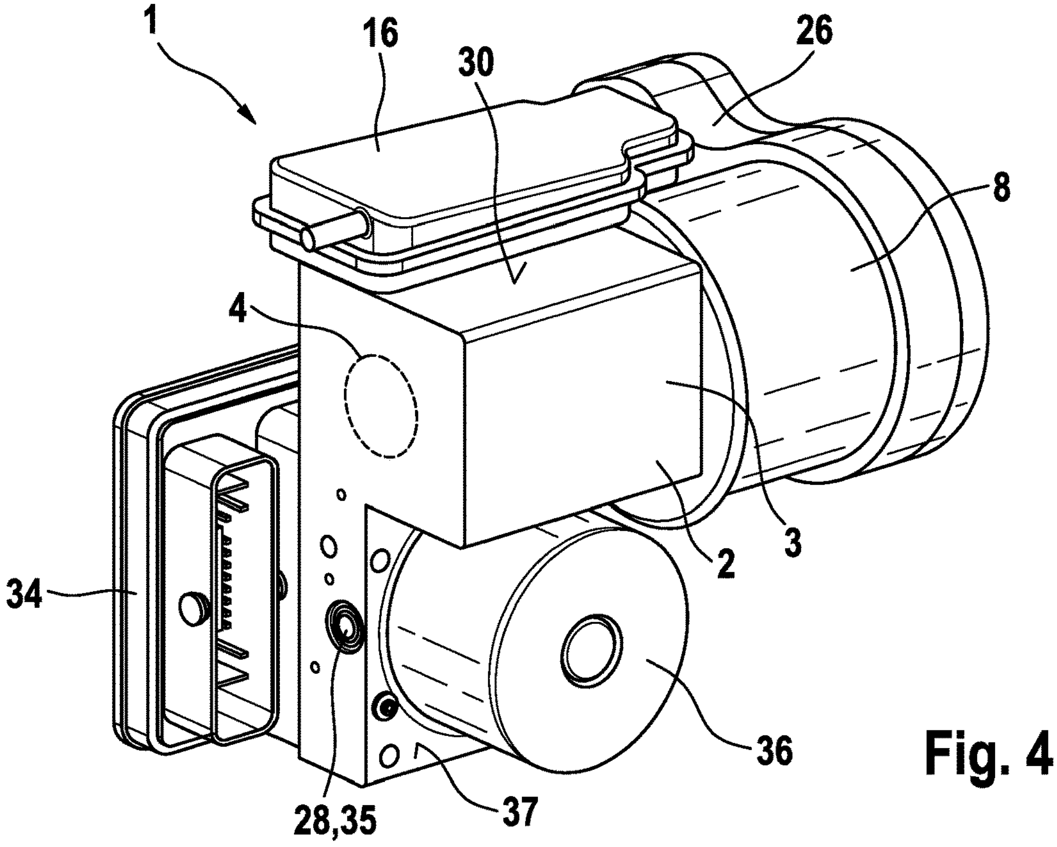
FIG. 4 shows a perspective representation of the hydraulic unit from FIG. 3.

Like the hydraulic unit 1 shown in FIGS. 1 and 2, the hydraulic unit 1 shown in FIGS. 3 and 4 is provided for generating a hydraulic brake pressure with power in a slip-controlled, electrohydraulic dual-circuit power brake system which is not otherwise shown. It may be used for autonomous driving up to levels 4 and 5. In contrast with the hydraulic unit 1 shown in FIGS. 1 and 2, the hydraulic unit 1 shown in FIGS. 3 and 4 has a slip control system such as antilock braking, traction control and/or vehicle dynamics control systems.

A hydraulic block 2 embodied according to the present invention of the hydraulic unit 1 from FIGS. 3 and 4 has, like the hydraulic block 2 of hydraulic unit 1 from FIGS. 1 and 2, a power cylinder bore 4 in which two power pistons 6, 7 are displaceable, a first power piston 6 of which is displaceable in the power cylinder bore 4 with power with an electric motor 8 by way of a screw transmission 9 and optionally a step-down transmission 10 to generate a hydraulic brake pressure A brake fluid reservoir 16 is arranged on the hydraulic block 2, the chambers of which reservoir, mutually independently in each brake circuit, communicate through a nonreturn valve 20 and a bypass line 21 with chambers 11, 12 in the power cylinder bore 4. The design and function of the hydraulic units 1 and hydraulic blocks 2 shown in FIGS. 1 and 2 and those shown in FIGS. 3 and 4 match in this respect, such that reference may be made to the above explanations relating to FIGS. 1 and 2 for the purpose of explaining FIGS. 3 and 4.

The hydraulic block 2 in FIGS. 3 and 4 is larger so that it is able to accommodate, apart from the power cylinder bore 4, solenoid valves 27, one or more hydraulic pumps 28 and further components of the slip control system such as nonreturn valves and hydraulic accumulators. In the exemplary embodiment, the hydraulic block 2 from FIGS. 3 and 4 is cuboidal and extended downward, i.e., relative to the brake fluid reservoir 16, in the region of the power cylinder bore 4 where it forms a power cylinder 3. Viewed axially relative to the power cylinder bore 4, the hydraulic block 2 from FIGS. 3 and 4 generally has an L-shape, a horizontal limb of the "L", on which the brake fluid reservoir 16 is arranged, forming the power cylinder 3 with the power cylinder bore 4, and a downward extending limb of the "L", which is integral with the power cylinder 3 and extends away from the brake fluid reservoir 16 from an underside of the power cylinder 3 opposite the brake fluid reservoir 16, having the components of the slip control system.

The hydraulic block 2 from FIGS. 3 and 4 has receptacles for the solenoid valves 27 of the slip control system in a valve side 31 adjoining an upper side 30. The upper side 30 of the hydraulic block 2 is that side on which the brake fluid reservoir 16 is arranged. The receptacles for the solenoid valves 27 are blind holes in the valve side 31 of the hydraulic block 2, which may have steps in diameter and/or circumferential grooves. Hydraulic parts of the solenoid valves 27, which may also be considered to be the actual valves, are arranged in pressure-tight manner in the receptacles. The armatures 32 and magnet coils of the solenoid valves 27 project perpendicularly outward from the valve side 31 of the hydraulic block 2. The solenoid valves 27 or valves and their armatures 32 and magnet coils are shown in the drawings in simplified manner as graphical symbols. The armatures 32 and magnet coils of the solenoid valves 27 of the slip control system are individually covered with valve domes 33 which are in turn together covered with a cover 34. The cover 34 has the shape of a cuboidal box with one open side with which it is arranged on the valve side 31 of the hydraulic block 2.

For slip control, the hydraulic block 2 from FIGS. 3 and 4 has a reciprocating pump with two pump pistons as the hydraulic pump 28. Such hydraulic pumps 28 of a slip control system are also denoted recirculating pumps. Each pump piston of the hydraulic pump 28 is associated with a brake circuit. In the exemplary embodiment, the two pump pistons are arranged equiaxially in a pump bore 35 which passes, parallel to the power cylinder bore 4, through the hydraulic block 2 below the power cylinder 3 and, in the exemplary embodiment, also below the receptacles for the solenoid valves 27.

To effect a stroke of the two pump pistons, the hydraulic pump 28 or reciprocating pump has an eccentric which is not visible in the drawings and is arranged in the pump bore 35 between the two pump pistons. An axis of rotation of the eccentric radially intersects an axis of the pump bore 35. A second electric motor 36 is arranged coaxially with the axis of rotation of the eccentric on the outside of the hydraulic block 2 on a motor side 37 of the hydraulic block 2 opposite the valve side 31. By way of the eccentric, the second electric motor 36 drives the two pump pistons in an axially reciprocating stroke motion in the pump bore 35 in order to deliver brake fluid.

In a wall, here denoted bottom of the cover 34, which is remote from the valve side 31 of the hydraulic block 2 and parallel to the valve side 31, the cover 34 has a second electronic control unit 38 which FIG. 3 shows in simplified manner as a graphical symbol. The second electronic control unit 38 controls the second electric motor 36 of the hydraulic pump 28 of the slip control system and the solenoid valves 27 of the slip control system and effects slip control of the vehicle brake system. No distinction is drawn here between open- and closed-loop control and the term "control" denotes either type.

In the event of a fault or failure of the power cylinder 3 or of the electric motor 8 for displacing the power pistons 6, 7 in the power cylinder bore 4 for generating the hydraulic brake pressure, the hydraulic brake pressure is generated with the hydraulic pump 28 of the slip control system. There is thus redundancy when it comes to generating the hydraulic brake pressure with power, it being possible to generate the hydraulic brake pressure necessary for brake actuation alternatively with the power cylinder 3 or the hydraulic pump 28, slip control no longer being possible in the event of a fault or failure relating to the slip control system. The two electronic control units 25, 38 also provide redundancy with regard to open- or closed-loop control of the hydraulic unit 1. Each electronic control unit 25, 38 and each electric motor 8, 36 is provided with a dedicated power supply (not shown).

The hydraulic block 2 from FIGS. 3 and 4 has four brake line ports 39 for hydraulic wheel brakes (not shown) of the vehicle brake system. The brake line ports 39 are indentations which, in the depicted exemplary embodiment of the present invention, are arranged in the valve side 31 of the hydraulic block 2 above the lid 34. The brake line ports 39 are arranged in a notional straight line parallel to the power cylinder bore 4 in the valve side 31 between the upper side 30 and the cover 34. While this arrangement of the brake line ports 39 is provided for the hydraulic unit according to the present invention 1 or hydraulic block 2 according to the present invention depicted in FIGS. 3 and 4, it is not in every case mandatory for the present invention. Other arrangements of the brake line ports 39 in the valve side 31 and/or also in other sides of the hydraulic block 2 are possible. The hydraulic wheel brakes are connected to the hydraulic block 2 or hydraulic unit 1 by brake lines with screw nipples or press-in nipples (not shown) on the brake line ports 39.

Once equipped with the power pistons 6, 7, the two electric motors 8, 36, the screw transmission 9, the hydraulic pump 28, the two electronic control units 25, 38, optionally the brake fluid reservoir 16 and any further components, the hydraulic block 2 forms the hydraulic unit 1.

What is claimed is:

1. A hydraulic block for a hydraulic unit for an electro-hydraulic dual-circuit power brake system, the hydraulic block comprising:

a power cylinder bore in which two power pistons are displaceably arranged;

two ports for a brake fluid reservoir which communicate with the power cylinder bore, wherein nonreturn valves which permit flow in a direction of the power cylinder bore are arranged in the hydraulic block between the ports for the brake fluid reservoir and the power cylinder bore, the nonreturn valves connecting the power cylinder bore to the ports for the brake fluid reservoir; and bypass lines which connect the ports for the brake fluid reservoir hydraulically in parallel to the nonreturn valves with the power cylinder bore;

wherein a second power piston of the two power pistons has a stroke limit stop which defines a home position of the second power piston.

2. The hydraulic block as recited in claim 1, wherein an electric motor is arranged on the hydraulic block and a screw transmission is arranged on or in the hydraulic block, the screw transmission being drivable in rotation with the electric motor and, when driven in rotation, displaces a first piston of the two power pistons in the power cylinder bore to generate a hydraulic brake pressure with power.

3. The hydraulic block as recited in claim 2, wherein an electronic control unit configured to control the electric motor is arranged on the electric motor.

4. The hydraulic block as recited in claim 3, wherein the hydraulic block has a hydraulic pump for redundantly generating the hydraulic brake pressure, and wherein the hydraulic block has a second electronic control unit configured to control the solenoid valves and/or the hydraulic pump.

5. The hydraulic block as recited in claim 2, wherein the first power piston is connected in compression- and tension-resistant manner to the screw transmission.

6. The hydraulic block as recited in claim 1, wherein the hydraulic block has a hydraulic pump for redundantly generating the hydraulic brake pressure.

7. The hydraulic block as recited in claim 6, wherein the hydraulic block has a reciprocating pump as the hydraulic pump and has a pump bore for the reciprocating pump.

8. The hydraulic block as recited in claim 1, wherein movement of the power pistons from a home position when the power cylinder is not actuated blocks the bypass lines.

9. The hydraulic block as recited in claim 1, wherein the nonreturn valves are arranged coaxially with the ports for the brake fluid reservoir in the hydraulic block.

10. The hydraulic block as recited in claim 1, wherein the hydraulic block has receptacles for solenoid valves for brake pressure control.

11. A hydraulic block for a hydraulic unit for an electro-hydraulic dual-circuit power brake system, the hydraulic block comprising:

a power cylinder bore in which two power pistons are displaceably arranged;

two ports for a brake fluid reservoir which communicate with the power cylinder bore, wherein nonreturn valves which permit flow in a direction of the power cylinder bore are arranged in the hydraulic block between the ports for the brake fluid reservoir and the power cylinder bore, the nonreturn valves connecting the power cylinder bore to the ports for the brake fluid reservoir; and bypass lines which connect the ports for the brake fluid reservoir hydraulically in parallel to the nonreturn valves with the power cylinder bore;

wherein the bypass lines have bores parallel to the ports for the brake fluid reservoir, into which oblique bores originating from the ports for the brake fluid reservoir open.

12. A hydraulic block for a hydraulic unit for an electro-hydraulic dual-circuit power brake system, the hydraulic block comprising:

a power cylinder bore in which two power pistons are displaceably arranged;

two ports for a brake fluid reservoir which communicate with the power cylinder bore, wherein nonreturn valves which permit flow in a direction of the power cylinder bore are arranged in the hydraulic block between the ports for the brake fluid reservoir and the power cylinder bore, the nonreturn valves connecting the power cylinder bore to the ports for the brake fluid reservoir; and bypass lines which connect the ports for the brake fluid reservoir hydraulically in parallel to the nonreturn valves with the power cylinder bore;

wherein an electric motor is arranged on the hydraulic block and a screw transmission is arranged on or in the hydraulic block, the screw transmission being drivable in rotation with the electric motor and, when driven in rotation, displaces a first piston of the two power pistons in the power cylinder bore to generate a hydraulic brake pressure with power;

wherein the first power piston is connected in compression- and tension-resistant manner to the screw transmission;

wherein the first power piston has no piston spring which biases it into its home position.

* * * * *